United States Patent [19]
Brunet et al.

[11] Patent Number: 4,723,996
[45] Date of Patent: Feb. 9, 1988

[54] METHOD AND DEVICE FOR PRODUCING REFRACTORY MATERIALS BY INDUCTION

[75] Inventors: Pierre Brunet, Saint Pierre D'Albigny; Fortunat Esnault, Grenoble; Guy Maybon, Saint Jorioz; René Perrier de la Bathie, Saint Pierre D'Albigny, all of France

[73] Assignee: Technogenia, S.A., Saint Jorioz, France

[21] Appl. No.: 25,064

[22] Filed: Mar. 12, 1987

[30] Foreign Application Priority Data
Mar. 13, 1986 [FR] France ................. 86 04119

[51] Int. Cl.⁴ .................. C22B 4/00; H05B 6/30
[52] U.S. Cl. ........................ 75/10.14; 373/138
[58] Field of Search ............. 75/10.14; 373/138

[56] References Cited

U.S. PATENT DOCUMENTS

| | | | |
|---|---|---|---|
| 1,839,518 | 1/1932 | Woods. | |
| 2,595,780 | 5/1952 | Dunlap. | |
| 2,876,094 | 3/1959 | Lusby | 75/10.14 |
| 4,594,105 | 6/1986 | Grimm | 75/58 |

OTHER PUBLICATIONS

Metals Handbook, Ninth Edition, "Spray Drying of Metal Powders".

Primary Examiner—Peter D. Rosenberg
Attorney, Agent, or Firm—William H. Eilberg

[57] ABSTRACT

A method and device are provided for producing refractory materials by induction, in which process a mixture of material powders and a binder in solution in water are compacted by extrusion so as to form a solid bar. The bar is introduced into a cold crucible and is caused to melt by magnetic induction. The molten material flows through a lower orifice of the crucible. The invention applies more particularly to the melting of tungsten carbide.

18 Claims, 1 Drawing Figure

METHOD AND DEVICE FOR PRODUCING REFRACTORY MATERIALS BY INDUCTION

BACKGROUND OF THE INVENTION

1. Field of the Invention

The present invention relates to refractory materials which up to now could not be melted without corroding or melting the receptacle which contained them. This is the case of metals such as tungsten (melting point 3400° C.), molybdenum (melting point 2600° C.), or refractory oxides and synthetic materials (silicides, carbides ...).

2. Description of the Prior Art

Up to the present time solid synthetic refractory materials (in the non powdery state) have been obtained either by sintering, or by melting in a consumable crucible.

Sintering generally consists in agglomerating powders, and heating the agglomerated work pieces so as to form "sintering bridges" between the particles and material. In the case of metals, they may then be hammered or rolled when hot until solid work pieces are obtained having the theoretic density of the metal. This is the technique used for obtaining tungsten or molybdenum work pieces.

Another sintering technique is used for producing cermets. This is liquid phase sintering. This technique is used for producing tungsten carbide work pieces. The powdery refractory carbides (CW, TIC, TAC) are mixed with cobalt powder. The mixtures are compressed and heated to the melting temperature of the cobalt. After cooling, the carbides are bonded by a ductile and tough cobalt film.

The production of molten tungsten carbide practiced up to now forms the "hot crucible" type of fusion. It takes place in the following way: a powdery mixture of carbon and tungsten is fed into a graphite crucible. The walls of this crucible are heated by induction by subjecting it to the action of a high frequency magnetic field, or by any other heating method. The crucible is then itself heated to a high temperature and its walls raise the temperature of the mixture of powders by thermal conduction. The powder mixture reaches the melting temperature by conduction. This temperature is close to 2750° C. That requires a good external insulation of the crucible, whose walls must be heated to an even higher temperature.

This method has numerous drawbacks, particularly:
  the amount of carbon in the alloy obtained is difficult to control for a part of the graphite of the crucible passes into the alloy; and for this reason the crucible is gradually consumed,
  continuous production cannot be contemplated because of the method of heating and because of heating the crucible itself.

Experience shows that melting a material such as tungsten carbide in a hot crucible requires very rapid discharge of the material from the crucible after melting, so as to obtain a satisfactory structure (see U.S. Pat. No. 1,839,518). That is incompatible with a continuous process. In fact, keeping a liquid mass of molten tungsten carbide for a sufficient time in a graphite crucible causes a progressive increase of the carbon content of the tungsten carbide. This increase involves an increase of the melting temperature. Consequently, it is very difficult to keep the contents of a crucible for the time necessary for a low even flow for spraying under good conditions.

Furthermore, induction heating techniques in a "cold crucible" are known, in which techniques a solid work piece is heated directly by subjecting it directly to the action of an alternating magnetic field. By "cold crucible" is meant a crucible in which the walls are designed for transmitting and concentrating the magnetic field without themselves being subjected to appreciable heating by induced currents. Such a type of "cold crucible" is described more particularly in the patent FR-A-2 036 418. However, it has proved difficult to heat and a fortiori to melt refractory powdery mixtures directly in such a "cold crucible". In fact, calculations show that for a grain size of a few tenths of a millimeter, for the tungsten powder for example, a magnetic field frequency higher than 1 MHz must be used. It is difficult to produce sufficient power at this frequency whose use is moreover likely to jam radiowaves. Such a solution does not then seem directly applicable in industry.

The aim of the present invention is more particularly to overcome the drawbacks of the known methods and devices, by providing means for directly heating the refractory powder mixture by magnetic induction.

SUMMARY OF THE INVENTION

In accordance with the invention, it is possible to carry out such melting in a "cold crucible", so that the material of the crucible, being at a relatively low temperature, does not combine even in a small proportion with the materials forming the mixture to be melted. Thus the composition and the proportions of the alloy obtained are strictly controlled.

In accordance with the invention, substantial saving is made in the melting of refractory materials.

According to another object, the invention makes it possible to provide a continuous melting process.

The invention also allows a divided product to be obtained directly, with rounded shapes, which provides both economic and technical advantages.

To attain these objects as well as others, the method of the invention comprises a step during which the refractory material is introduced into a "cold crucible" in a compacted form having an appropriate self supporting shape and sufficient cohesion for handling, as well as suitable electric resistivity, and the material is heated directly by induction up to a temperature higher than its melting temperature.

In the following description, and in the claims, by compacting is meant an agglomeration of grains of material under pressure so as to obtain a self supporting shape and sufficient electric conductivity in particular by bringing the grains close together.

Depending on the application, the term "material powder" designates either powder of the refractory metal for obtaining a pure metal element, or a mixture of different refractory material powders for synthesizing an alloy or a combination.

The term "self supporting" means that the element made from compacted material does not tend to break up when it is carried; for example, an element in the form of a piece or a bar may be lifted by one end and transported without breaking.

The method may be made continuous by using a "cold crucible" of particular shape, having a bottom pierced with an orifice through which the molten metal is caused to flow permanently; the material to be melted is introduced through the upper opening of the crucible.

It is gradually heated by induction during its transfer from the top to the bottom of the crucible. The continuous character of the method considerably facilitates and accelerates the melting, because a part of the molten metal is in contact with a not yet molten part, the molten material being more receptive of the magnetic energy and tending to accelerate the heating by conduction of the adjacent not yet molten part of the material.

The continuous character of the method further allows the flow of molten material to be divided at the outlet of the crucible and the form of the particles obtained adjusted.

Depending on the physical characteristics of the materials to be melted, compacting must be provided using different methods.

In the case of materials which agglomerate readily under pressure, for example for pure and very fine tungsten powder, the material is compacted by cold compression, at a pressure of 100 to 500 bars, so as to give it the desired compact and self supporting shape.

However, such a compacting method by simple cold compression is not suitable for a carbon and tungsten mixture. Then a subsequent sintering operation may be practiced, by heating the compacted mixtured, to a high temperature a little less than the melting temperature of the mixture, for example to a temperature of 800° to 1000° C.

In accordance with the invention, in the cases where compacting the material by compression alone does not seem sufficient, compacting is achieved by applying a pressure to a mixture of the materials to be melted with a binder, the binder being possibly in solution in a solvent. After compacting, if solvent is present, it is partially eliminated at least by drying.

In one embodiment, compacting is achieved by pressure molding a mixture of material with the binder in solution in the solvent.

In another embodiment more adapted to continuous production, compacting is achieved by extrusion with or without core wire of a material mixture with the binder in solution in the solvent. The material of the core wire is chosen so as to have no incompatibility with the extruded mixture.

BRIEF DESCRIPTION OF THE DRAWING

These objects as well as others of the present invention will be clear from the following description of particular examples and of a device described with reference to the accompanying FIG. 1 showing a cold crucible in accordance with the invention.

DESCRIPTION OF THE PREFERRED EMBODIMENT

Figure 1:
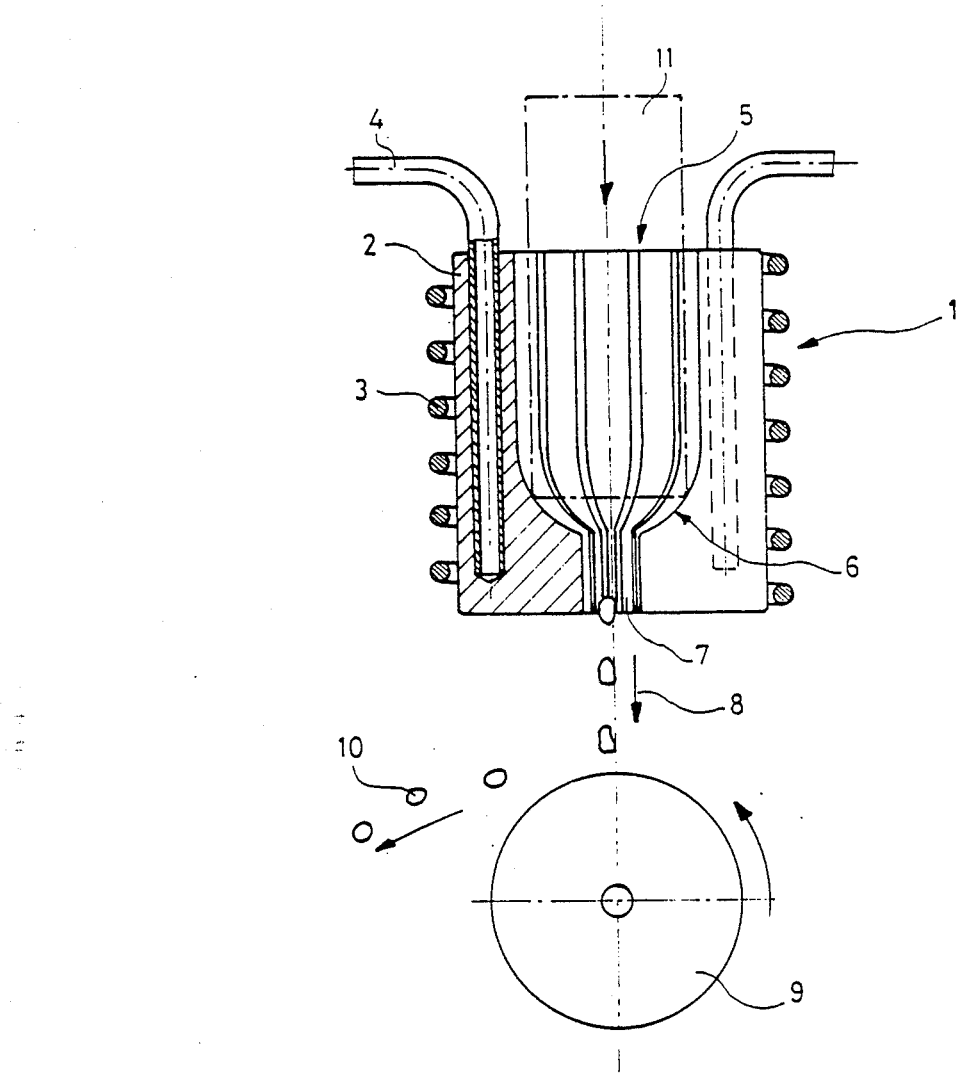

The following description applies mainly to the production of molten tungsten carbide from carbon and tungsten powders.

The powdery state of the carbon and of the tungsten leads to obtaining an homogeneous mixture and provides a very high chemical reactivity. The two powders are mixed with an organic binder and a solvent such as water. The amount of binder must be sufficient to allow extrusion of the mixture. This amount is normally between 0.5 and 2.5% by weight of the mixture. The amount of water is also adjusted as a function of the properties required for the extrusion. It is generally from three to four times the amount by weight of binder.

The nature of the binder directly affects the electrical conductivity of the compacted product. The binder also influences the procedure of bringing the grains closer together and the provision of the mixture. It has been discovered that the binders usually used for agglomeration before sintering are not suitable for fusion by induction. A binder will be preferably used capable of decomposing at high temperature, for example by pyrolysis.

Good results have been obtained with polysaccharide binders, such as galactomannose, hydroxyethylmethylcellulose, a carboxymethylcellulose such as carbohexamethylcellulose, or an alginate.

Extrusion takes place for example under a pressure of about 200 bars using a known extruder and, after extrusion, the product is in the form of compact and self supporting bars. After a few hours drying, the major part of the water is removed, the bars are rigid and may be handled.

The bars are then preheated so as to remove the residual water and the greatest part of the organic binder. The treatment takes place at a temperature close to 800° C. To avoid oxidation of the carbon/tungsten mixture, this treatment is carried out in a sealed oven with circulation of the inert gas. The carbon coming from the decomposition of a binder forms a very small proportion of the composition of the mixture and is practically negligible.

It has been discovered that, after this heat treatment, the electric conductivity of the mixture is substantially increased and the bar may be directly heated by electromagnetic induction.

Melting is carried out in a "cold crucible", shown schematically in FIG. 1. The crucible 1 includes a copper cylinder 2 with substantially vertical axis, divided into sections along radial planes and surrounded by an electric conductor 3 in the form of a coaxial coil connected to a high frequency current generator not shown in the figure. The sectors of the copper cylinder are cooled by the circulation of a fluid such as water, through ducts 4. A crucible may be used having ten or so sectors. The crucible is open at the top through a central upper aperture 5 of large diameter for introducing the materials to be melted. The bottom 6 of the crucible is rounded. Such forms of crucibles have been known for several years.

However, in accordance with the invention, the bottom 6 of the crucible includes a lower central orifice 7 placing the inside of the crucible in communication with the outside, and allowing the flow of molten material. Pieces or bars 11 of the compacted material to be melted are used, whose section is greater than the section of the lower orifice 7, and less than the section of the upper opening 5.

In the embodiment shown, at the outlet and below the crucible is disposed a solid copper cylinder 9 rotated about a horizontal axis by drive means and onto the periphery of which the molten material flows. The cylinder 9 divides the flow so as to obtain fragmented elements of the material to the desired dimensions and shapes. The speed of rotation of the cylinder is advantageously about 3000 rpm. It has been surprisingly discovered that with such a device the molten tungsten carbide can be divided up without damaging the cylinder, although the temperature of the molten tungsten carbide is very much higher than the melting temperature of copper.

In operation, the bar 11 of compacted material to be melted is engaged in the crucible through the upper opening 5 and rests freely on the bottom 6 of the crucible. By supplying conductor 3 with electric power, the bar is gradually heated and its lower part melts and flows through orifice 7. Bars may advantageously be used whose length is substantially greater than the depth of the crucible, so as not to have to reload it too often with bars. Several bars may further be stacked one after the other so as to provide a continuous process.

Alternately, the satisfactory results are also obtained when the material to be melted is introduced in the cold crucible in the form of precompacted pieces, simply packed in the crucible.

EXAMPLE n·1

The continuous flow of a tungsten carbide mixture of type WC-W$_2$C can be obtained, that is to say containing about 4% by weight of carbon. After extrusion, preheating is carried out at about 800° C. The crucible used for the fusion includes a bottom 6 and a flow orifice 7 of about 10 mm in diameter. The frequency required for obtaining fusion under good conditions is about 250 to 400 KHz. The material output is close to 400 g/min for a power of 60 Kw.

EXAMPLE n·2

The method may be used for melting pure tungsten. Tungsten powder is mixed with 2% of an organic binder, and 6% of water is added. By extruding at 200 bars a tungsten bar is obtained of about 20 mm in diameter. The bars are preheated for a few minutes at 1000° C. in an oven in an argon atmosphere to completely eliminate the binder. The bars are then heated to melting temperature in the cold crucible. The frequency used may be lower; for example good results may be obtained with a frequency of about 30 KHz.

In all applications, sufficient compacting must be provided so that the bar or the pieces of material introduced into the crucible have a suitable electric resistivity. In fact, the resistivity must be such that the electric currents induced in the bar or the piece by the magnetic field are sufficiently intense to provide heating and melting of the bar or the piece. Thus it is considered that the resistivity of the compacted material, in order to be suitable, must be less than a predetermined maximum value P. this predetermined maximum value P depends on several parameters. It may be calculated from MAXWELL's equations leading to the formula giving the skin thickness as a function of the resistivity of the material and of the frequency of the magnetic field. Considered that, when the maximum resistivity P is reached, the skin thickness in the material is equal to half the radius, for a cylindrical bar of revolution. The formula for calculating the maximum predetermined value P is, in this case:

$$\frac{500 \sqrt{P}}{\mu F} = \frac{R}{2}$$

P being the maximum resistivity in ohm.meter,
u the magnetic permeability,
F the frequency in KHz used for induction heating,
R the radius of the bar or the mean radius of the piece, in millimeters.

The present invention is not limited to the embodiments which have been more explicitly described, it includes the different variants and generalizations thereof contained in the scope of the following claims.

What is claimed is:

1. A method of forming refractory material elements by fusion from refractory material powder, including a step during which the material is introduced into a "cold crucible", in the form of a compacted powder having a self supporting form, wherein the material is heated directly by induction up to a temperature higher than its melting temperature, and wherein the electric resistivity of the material is such that the electric current induced in the material is sufficiently intense to melt the material.

2. The method as claimed in claim 1, wherein the compacted and self supporting material is introduced through an upper opening in the crucible and the molten material is caused to flow permanently through a lower orifice formed at the bottom of said crucible.

3. The method as claimed in claim 2, wherein, at the outlet of the lower orifice, the flow of molten material is divided by causing it to fall onto a rotary solid copper cylinder so as to obtain elements of the desired shape and size.

4. The method as claimed in claim 1, including a previous step for compacting the material in the form of a powder, so as to give it an appropriate self supporting shape and so as to give it a suitable resistivity allowing the subsequent operation of fusion by induction.

5. The method as claimed in claim 4, wherein the compacting is achieved by compressing a powder mixture of the material, then heating the mixture to a high temperature adequate for obtaining sintering giving sufficient cohesion and suitable resistivity.

6. The method as claimed in claim 4, wherein the compacting is achieved by compressing a powder mixture of the material under a sufficiently high pressure to give it sufficient cohesion and suitable resistivity.

7. The method as claimed in claim 4, wherein the compacting is achieved by compressing a powder mixture of the material with a binder.

8. The method as claimed in claim 4, wherein the compacting is achieved by extruding, with or without core wire, a powder mixture with a binder.

9. The method as claimed in claim 7, wherein said binder is removable at high temperature.

10. The method as claimed in claim 7, wherein said binder is in solution in a volatile solvent, and, after compacting, the solvent is removed at least partially by drying.

11. The method as claimed in claim 4, wherein the compacting includes a subsequent operation during which the mixture is heated to a high temperature adequate for obtaining sintering giving sufficient cohesion and suitable resistivity.

12. The method as claimed in claim 1, wherein the compacted material is in the form of pieces having a larger section than the section of a lower orifice of said crucible.

13. The method as claimed in claim 12, wherein the compacted material has an electric resistivity less than a predetermined maximum resistivity, the maximum resistivity being such that, at the frequency used for heating the material by induction, the skin thickness in the material is equal to half the mean radius of the pieces of material.

14. The method as claimed in claim 12, wherein the compacted material in pieces rests freely on the bottom of the crucible during the melting operation.

15. The method as claimed in claim 9, wherein said binder is a polysaccharide such as galactomannose or a carboxylmethylcellulose or hydroxyethylmethylcellulose or an alginate.

16. The method as claimed in claim 4, wherein a binder is present in the mixture in a proportion between 0.5 and 2.5% by weight of the dry mixture.

17. A method of forming refractory material elements by fusion from refractory material powder, including a step during which the material is introduced into a "cold crucible", in the form of a compacted powder having a self supporting form, the material being heated directly by induction up to a temperature higher than its melting temperature, the electric resistivity of the material being such that the electric current induced in the material is sufficiently intense to melt the material, the "cold crucible" being formed of a copper cylinder divided into sectors along radial planes and cooled by a fluid flowing through ducts, the cylinder having a bottom and an upper opening for introducing the materials to be melted, the bottom of the crucible having an orifice with an area less than the cross-sectional area of the material being melted, the orifice being permanently open, so that the material to be melted may rest on the bottom of the crucible and flow through the orifice after melting.

18. The method of claim 17, further comprising the step of directing the molten material, leaving the orifice, onto a solid cylinder, the cylinder being rotated by a drive means, so that the material leaving the crucible is divided and so that elements of the desired shape and dimensions are formed.

* * * * *